United States Patent
Kim et al.

(10) Patent No.: US 10,284,065 B2
(45) Date of Patent: May 7, 2019

(54) HORIZONTAL LINEAR VIBRATION MOTOR

(71) Applicant: MPLUS CO., LTD., Suwon-si, Gyeonggi-do (KR)

(72) Inventors: Yong Tae Kim, Suwon-si (KR); Yeon Ho Son, Suwon-si (KR); Dong Su Moon, Suwon-si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 137 days.

(21) Appl. No.: 15/597,246

(22) Filed: May 17, 2017

(65) Prior Publication Data
US 2017/0373575 A1    Dec. 28, 2017

(30) Foreign Application Priority Data

Jun. 23, 2016  (KR) .................. 10-2016-0078775

(51) Int. Cl.
| | | |
|---|---|---|
| *H02K 33/00* | (2006.01) | |
| *H02K 33/16* | (2006.01) | |
| *F16F 1/04* | (2006.01) | |

(52) U.S. Cl.
CPC ............. *H02K 33/00* (2013.01); *H02K 33/16* (2013.01); *F16F 1/04* (2013.01)

(58) Field of Classification Search
CPC ........ H02K 33/00; H02K 33/16; B06B 1/045; F16F 1/04
USPC ........................................ 310/15, 25, 36–37
See application file for complete search history.

(56) References Cited

U.S. PATENT DOCUMENTS

| | | | | |
|---|---|---|---|---|
| 6,700,251 | B2* | 3/2004 | Kobayashi | H02K 33/02 310/15 |
| 8,384,259 | B2* | 2/2013 | Choi | H02K 33/16 310/15 |
| 2007/0040457 | A1* | 2/2007 | Shimizu | A61C 17/3445 310/15 |
| 2009/0235713 | A1* | 9/2009 | Toeniskoetter | B21D 39/021 72/220 |

FOREIGN PATENT DOCUMENTS

| | | |
|---|---|---|
| CN | 1792022 A | 6/2006 |
| CN | 204271874 U | 4/2015 |
| JP | 2002199689 A | 7/2002 |

(Continued)

OTHER PUBLICATIONS

KIPO Office Action for Korean Application No. 10-2016-0078775 dated Nov. 9, 2017, which corresponds to he above-referenced U.S. application.

(Continued)

*Primary Examiner* — Quyen P Leung
*Assistant Examiner* — Leda T Pham
(74) *Attorney, Agent, or Firm* — LRK Patent Law Firm (57) ABSTRACT

A horizontal linear vibration motor for securing the straightness of a coil spring and preventing a driving unit, such as a mass body, from axially rotating around the axis of a shaft within a housing due to the rotational property of the coil spring by providing a coil and a magnet for generating a force that enables the reciprocating motion of the driving unit including the mass body and an anti-rotation member provided in the driving unit to slide and come into contact with the housing.

5 Claims, 6 Drawing Sheets

(56) References Cited

FOREIGN PATENT DOCUMENTS

| | | |
|---|---|---|
| JP | 2004343931 A | 12/2004 |
| KR | 1020020025655 A | 4/2002 |
| KR | 1020030088468 A | 11/2003 |
| KR | 1020060003092 A | 1/2006 |
| KR | 10-1084860 B | 11/2011 |
| KR | 1020150090801 A | 8/2015 |

OTHER PUBLICATIONS

SIPO Office Action for Chinese Application No. 201710433531.3 dated Dec. 26, 2018, which corresponds to the above-referenced U.S. application.

* cited by examiner

HORIZONTAL LINEAR VIBRATION MOTOR

CROSS REFERENCE TO RELATED APPLICATION

The present application claims the benefit of Korean Patent Application No. 10-2016-0078775, filed in the Korean Intellectual Property Office on Jun. 23, 2016, the entire content of which is incorporated herein by reference.

BACKGROUND OF THE INVENTION

1. Technical Field

The present invention relates to a horizontal linear vibration motor and, more particularly, to a horizontal linear vibration motor capable of securing the straightness of a coil spring and also preventing a driving unit, such as a mass body, from axially rotating around the axis of a shaft within a housing due to the rotational property of the coil spring by providing a coil and a magnet for generating a force that enables the reciprocating motion of the driving unit including the mass body and an anti-rotation member provided in the driving unit to slide and come into contact with the housing.

2. Description of Related Art

As the mobile device market recently grows greatly, various technologies capable of being implemented in the mobile device are being developed.

In recent years, a mobile device is adopting a touch screen. In general, a haptic function for generating vibration is used if a touch screen is touched.

Accordingly, the lifespan of a vibration motor for generating vibration becomes important. As the thickness of the mobile device is gradually reduced, it is also necessary to reduce the thickness of the vibration motor.

For this reason, a horizontal linear vibration motor having advantages of a stabilized lifespan and a small thickness compared to an existing coin type vibration motor or an existing vertical linear vibration motor is gradually highlighted.

In common horizontal linear vibration motors, a mass-production structure that belongs to products having a small thickness and that is most stabilized is a structure using a coil spring.

However, a shaft capable of securing the straightness of a coil spring by penetrating and supporting the inside of the coil spring is used due to the limit of the coil spring incapable of securing straightness.

In addition, in order to prevent a problem in that the coil spring axially rotates around the shaft while moving, that is, a touch within a housing attributable to the rotation of a moving assembly, a rotatory force is offset using two shafts or an anti-rotation structure using magnets in which the magnets are respectively fixed to the housing and the moving assembly by magnetism in order to prevent the axial rotation is used.

However, such a structure becomes a factor to hinder the spread of the horizontal linear vibrator because it causes a complicated structure and a rise of the cost of materials. Accordingly, an embodiment of the present invention proposes a structure for preventing the rotation of the coil spring, which is simple and has a low cost of materials.

PRIOR ART DOCUMENT

Patent Document (Patent Document 1) Korean Patent No. 1084860

SUMMARY OF THE INVENTION

Accordingly, the present invention has been made keeping in mind the above problems occurring in the prior art, and an object of the present invention is to provide a horizontal linear vibration motor capable of securing the straightness of a coil spring and also preventing a driving unit, such as a mass body, from axially rotating around the axis of a shaft within a housing due to the rotational property of the coil spring by providing a coil and a magnet for generating a force that enables the reciprocating motion of the driving unit, including the mass body, and an anti-rotation member provided in the driving unit to slide and come into contact with the housing.

A horizontal linear vibration motor an embodiment of the present invention includes a housing configured to have an internal space, a main shaft fixed to the housing, a driving unit configured to include a mass body capable of driving through the main shaft, an anti-rotation member provided within the housing, a coil and magnet disposed at locations facing each other within the housing and supplied with external power to generate a force that enables the driving unit to perform a reciprocating motion, and one or more elastic members disposed between the housing and the driving unit to transfer vibration.

The anti-rotation member may include a hollow part, and one side of the mass body may be inserted into the hollow part.

Furthermore, the anti-rotation member may include a main body and at least one protrusion part provided on one side of the main body. The anti-rotation member may be included in the driving unit and driven along with the mass body.

The driving unit may further include a guide shaft connected to one side of the mass body to slide and come into contact with the anti-rotation member.

The anti-rotation member may be fixed with the housing and comes into contact with the housing, the anti-rotation member may include a hollow part, and a guide shaft may be disposed within the housing through the hollow part of the anti-rotation member separately from the main shaft.

Furthermore, a longitudinal section of the hollow part may include any one of a rectangle, a circle and an oval. The horizontal linear may further include a slide film provided in a gap between the anti-rotation member and the housing.

Furthermore, the horizontal linear vibration motor may further include magnet yokes disposed at ends of the magnet or the coil.

DETAILED DESCRIPTION

Hereinafter, in this specification, the contents of the present invention will be described in detail in connection with some exemplary embodiments, with reference to the accompanying drawings. It is to be noted that in assigning reference numerals to elements in the drawings, the same reference numerals denote the same elements throughout the drawings even in cases where the elements are shown in different drawings. Furthermore, in describing the embodiments of the present invention, a detailed description of the known functions and constitutions will be omitted if it is deemed to make the gist of the present invention unnecessarily vague.

Furthermore, in describing the elements of this specification, terms, such as the first, the second, A, B, (a), and (b), may be used. However, although the terms are used only to distinguish one element from the other element, the essence, order, or sequence of the elements is not limited by the terms. When it is said that one element is "connected", "combined", or "coupled" to the other element, the one element may be directly connected or coupled" to the other element, but it should also be understood that a third element may be "connected", "combined", or "coupled" between the two elements.

Figure 1:
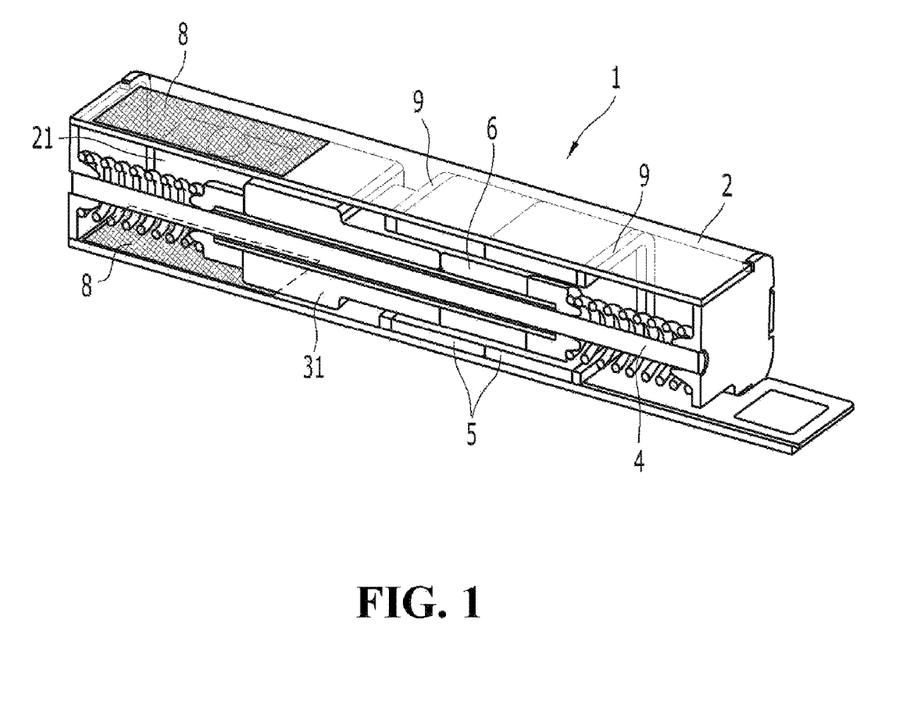
FIG. 1 is a perspective view of a horizontal linear vibrator including a driving unit and an anti-rotation member according to an embodiment of the present invention.

FIG. 1 is a perspective view of a horizontal linear vibrator including a driving unit and an anti-rotation member according to an embodiment of the present invention.

Referring to FIG. 1, the horizontal linear vibration motor 1 according to an embodiment of the present invention includes a housing 2 configured to have an internal space, a main shaft 4 fixed to the housing 2, a driving unit 3 configured to include a mass body 31 capable of driving through the main shaft 4, an anti-rotation member 21 provided within the housing 2, a coil 5 and magnet 6 disposed at locations facing each other within the housing 2 and supplied with external power to generate a force that enables the driving unit 3 to perform a reciprocating motion, and one or more elastic members 7 disposed between the housing 2 and the driving unit 3 to transfer vibration.

Coil type springs are disposed on both sides of the driving unit.

Accordingly, if straightness is secured, but the characteristics of the coil type spring having a rotational property are taken into consideration, there is a need for an efficient anti-rotation member for preventing the rotation of the driving unit incidental to the coil type spring.

In an embodiment of the present invention, the anti-rotation member 21 is coupled to the mass body 31 in order to prevent the entire driving unit 3 including the mass body from rotating within the housing 2.

Figure 2:
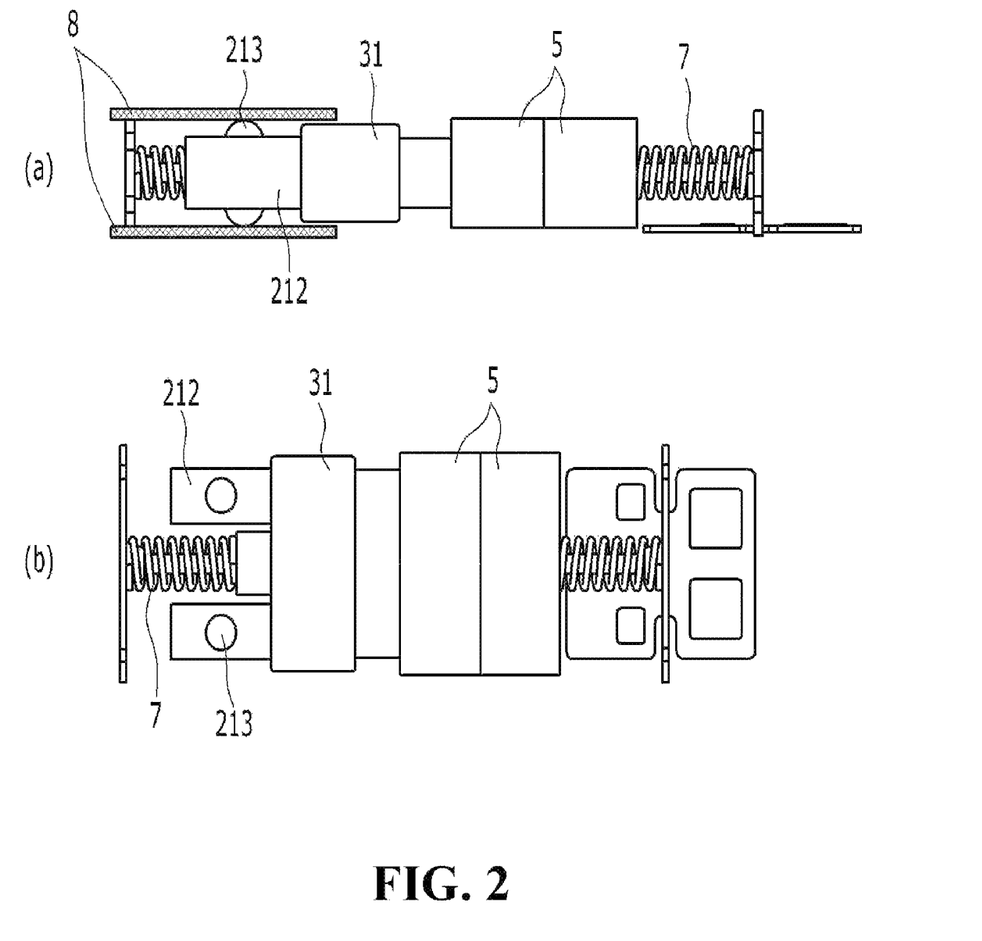
FIG. 2 is a side view and plan view of the driving unit and the anti-rotation member according to an embodiment of the present invention.

FIG. 2 is a side view and plan view of the driving unit and the anti-rotation member according to an embodiment of the present invention.

As shown in FIG. 2, at least one anti-rotation member 21 is provided. Accordingly, the entire driving unit 3 including the mass body 31 can be prevented from rotating.

More specifically, the anti-rotation member 21 includes a main body 212 and at least one protrusion part 213 provided on one side of the main body 212. Accordingly, the anti-rotation member 21 is included in the driving unit 3 and can be driven along with the mass body 31.

The protrusion part 213 does not need to be essentially hemispherical. The protrusion part is coupled to a slide film within the housing 2 to prevent the entire driving unit 3, including the anti-rotation member 21, from rotating.

Figure 3:
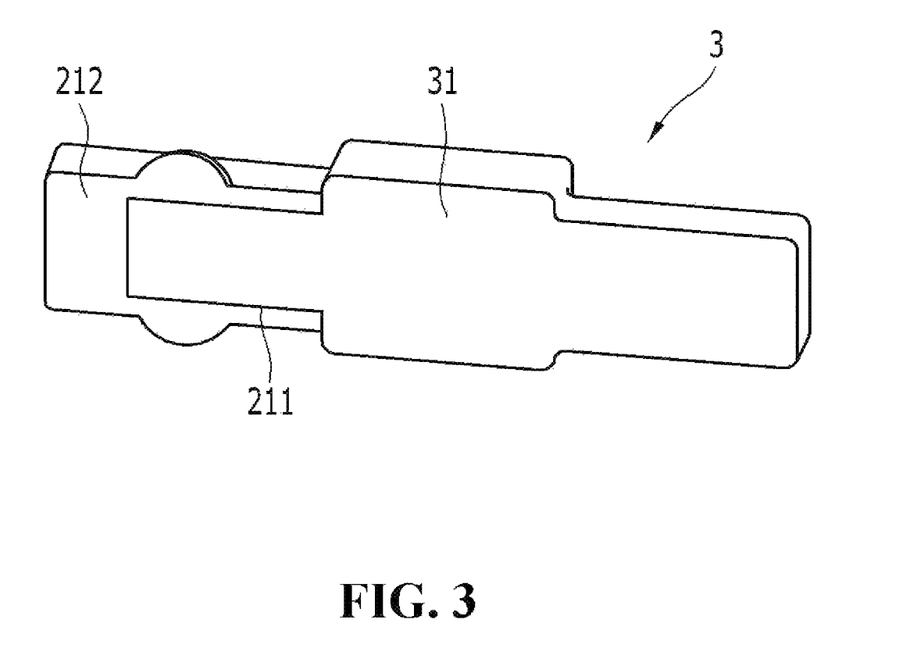
FIG. 3 is a cross-sectional view of the driving unit and the anti-rotation member according to an embodiment of the present invention.

FIG. 3 is a cross-sectional view of the driving unit and the anti-rotation member according to an embodiment of the present invention.

Referring to FIG. 3, the anti-rotation member 21 includes a hollow part 211. One side of the mass body 31 that has been protruded may be inserted into the hollow part 211 of the anti-rotation member 21.

Through such a structure, the mass body 31 can be coupled to the anti-rotation member without adding a separate element to the mass body.

Figure 4:
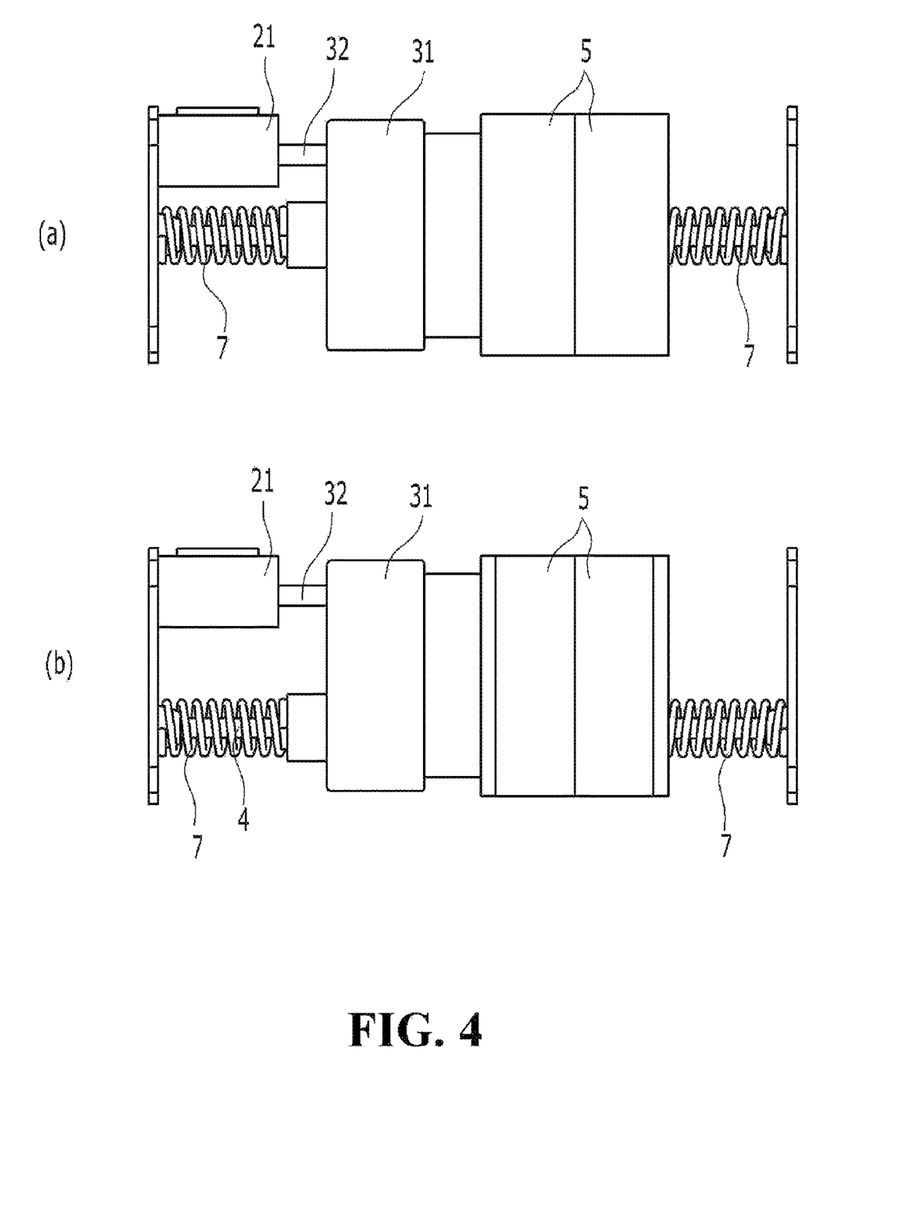
FIG. 4 is a plan view of the driving unit, guide and anti-rotation member according to an embodiment of the present invention.
Figure 5:
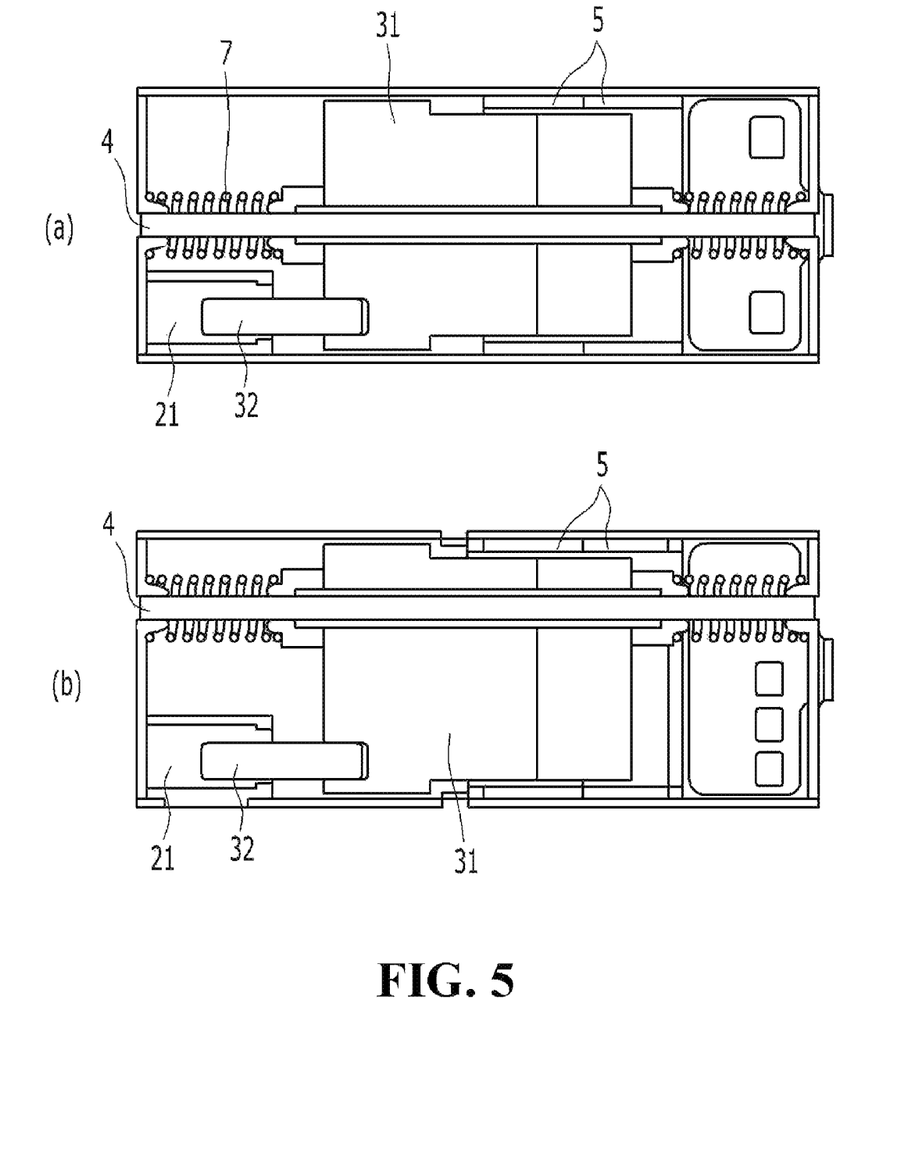
FIG. 5 is a plan cross-sectional view of the driving unit, guide and anti-rotation member according to an embodiment of the present invention.

FIG. 4 is a plan view of the driving unit, guide and anti-rotation member according to an embodiment of the present invention, and FIG. 5 is a plan cross-sectional view of the driving unit, guide and anti-rotation member according to an embodiment of the present invention.

From FIGS. 4 and 5, it may be seen that the main shaft 4 has been located at the center of the mass body or at a place that is not the center of the mass body.

The driving unit 3 may further include a guide shaft 32 connected to one side of the mass body 31 to slide and come into contact with the anti-rotation member 21.

Furthermore, the anti-rotation member 21 is fixed within the housing 2 and comes into contact therewith. The anti-rotation member 21 includes the hollow part 211. The guide shaft 32 may be disposed within the housing 2 through the hollow part 211 of the anti-rotation member 21 separately from the main shaft 4.

As shown in (a) of FIG. 5, the main shaft may be configured at the center of the mass body. In contrast, if the distance between the main shaft and the guide shaft is increased as shown in (b) of FIG. 5, an effect of preventing rotation is further increased.

Figure 6:
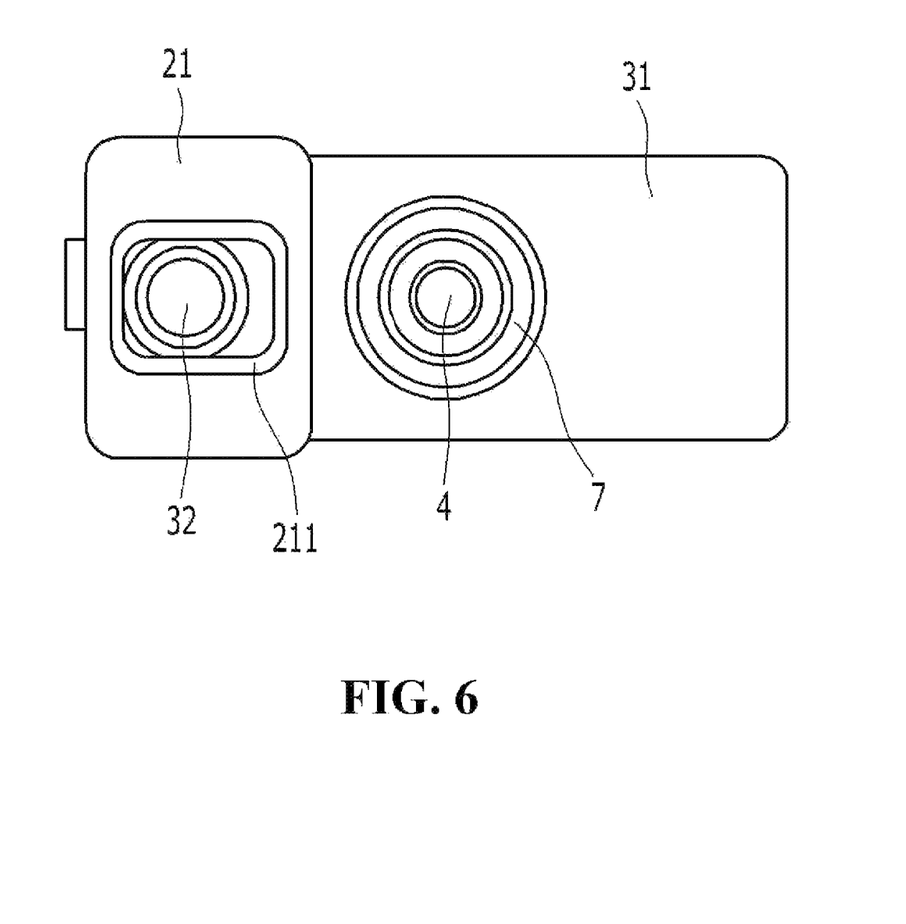
FIG. 6 is a front view of the driving unit, guide and anti-rotation member according to an embodiment of the present invention.

FIG. 6 is a front view of the driving unit, guide and anti-rotation member according to an embodiment of the present invention. A longitudinal section of the hollow part 211 may be any one of a rectangle, a circle and an oval.

Referring to FIG. 6, the hollow part may be fixed up and down and may have a gap left and right in a relation with the guide shaft.

Furthermore, referring back to FIG. 2, the horizontal linear vibration motor 1 may further include the slide film 8 provided in the gap between the anti-rotation member 21 and the housing 2.

The slide film is provided in the gap between the anti-rotation member 21 and the housing 2, thus being capable of helping the coil type spring a smoother straight motion.

Additionally, referring to FIG. 1, it is necessary to increase an electromagnetic force in order to maximize a driving characteristic achieved by the coil and the magnet according to an embodiment of the present invention. The electromagnetic force can be maximized by locating magnetic yokes 9 at both ends of the coil or the magnet.

According to the present invention, the coil and magnet for generating a force that enables the reciprocating motion of the driving unit including the mass body, and the anti-rotation member is provided in the driving unit to slide and come into contact with the housing. Accordingly, there are advantages in that the straightness of the coil spring can be secured and the driving unit, such as the mass body, can be prevented from axially rotating around the axis of the shaft within the housing due to the rotational property of the coil spring.

Although the present invention has been described above, a person having ordinary skill in the art to which the present invention pertains will recognize that the present invention may be implemented in other forms while maintaining the technical spirit and essential characteristics of the present invention.

Accordingly, the aforementioned embodiments are merely illustrative and are not intended to restrict the scope of the present invention to the aforementioned embodiments only. Furthermore, the illustrated flowcharts are only sequences illustrated to obtain the most preferred results in implementing the present invention, and other steps may be added to the flowcharts or some steps may be omitted from the flowcharts.

The scope of the present invention will be defined by the claims, but it is to be construed that all of changes or modified forms derived from an element directly derived from the writing of the claims and an equivalent element thereof belong to the scope of right of the present invention.

What is claimed is:

1. A horizontal linear vibration motor comprising:
a housing (2) configured to have an internal space;
a main shaft (4) fixed to the housing (2);
a driving unit (3) configured to comprise a mass body (31) which the main shaft (4) passes through;
an anti-rotation member (21) provided within the housing (2);
a slide film (8) provided in a gap between the anti-rotation member (21) and the housing (2);
a coil (5) and magnet (6) disposed at locations facing each other within the housing (2) and supplied with external power to generate a force that enables the driving unit (3) to perform a reciprocating motion; and
one or more elastic members (7) disposed between the housing (2) and the driving unit (3) to transfer vibration,
wherein:
the anti-rotation member (21) comprises a main body (212) and at least one protrusion part (213) provided on one side of the main body (212); and
the at least one protrusion part (213) is coupled to the slide film (8) in such a manner as to prevent the driving unit (3) including the anti-rotation member (21) from rotating within the housing (2).

2. The horizontal linear vibration motor of claim 1, wherein:
the anti-rotation member (21) comprises a hollow part (211), and
one side of the mass body (31) is inserted into the hollow part (211).

3. The horizontal linear vibration motor of claim 2, wherein:
the anti-rotation member (21) is included in the driving unit (3) and driven along with the mass body (31).

4. A horizontal linear vibration motor comprising:
a housing (2) configured to have an internal space;
a main shaft (4) fixed to the housing (2);
a driving unit (3) configured to comprise a mass body (31) which the main shaft (4) passes through;
an anti-rotation member (21) provided within the housing (2);
a coil (5) and magnet (6) disposed at locations facing each other within the housing (2) and supplied with external power to generate a force that enables the driving unit (3) to perform a reciprocating motion; and
one or more elastic members (7) disposed between the housing (2) and the driving unit (3) to transfer vibration,
wherein:
the anti-rotation member (21) is fixed to the housing (2) and comes into contact with the housing (2);
the anti-rotation member (21) comprises a hollow part (211) and a main body (212);
the driving unit (3) further comprises a guide shaft (32) disposed separately from the main shaft (4) and coupled to one side of the mass body (31) to slide and come into contact with the anti-rotation member (21); and
the guide shaft (32) is inserted into the hollow part (211) of the anti-rotation member (21) in such a manner as to prevent the driving unit (3) including the mass body (31) from rotating within the housing (2).

5. The horizontal linear vibration motor of claim 4, wherein a longitudinal section of the hollow part (211) comprises any one of a rectangle, a circle and an oval.

* * * * *